(12) United States Patent
Buendgen et al.

(10) Patent No.: US 10,545,767 B2
(45) Date of Patent: *Jan. 28, 2020

(54) RESOURCE-BASED BOOT SEQUENCE

(71) Applicant: International Business Machines Corporation, Armonk, NY (US)

(72) Inventors: Reinhard T. Buendgen, Tuebingen (DE); Jakob C. Lang, Weil im Schoenbuch (DE); Volker Boenisch, Boeblingen (DE); Angel Nunez Mencias, Stuttgart (DE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/378,612

(22) Filed: Apr. 9, 2019

(65) Prior Publication Data

US 2019/0220286 A1 Jul. 18, 2019

Related U.S. Application Data

(63) Continuation of application No. 15/651,181, filed on Jul. 17, 2017.

(51) Int. Cl.
| | | |
|---|---|---|
| *G06F 9/4401* | (2018.01) | |
| *G06F 9/445* | (2018.01) | |
| *G06F 9/50* | (2006.01) | |

(52) U.S. Cl.
CPC ........ *G06F 9/4401* (2013.01); *G06F 9/44505* (2013.01); *G06F 9/5038* (2013.01); *G06F 9/5005* (2013.01)

(58) Field of Classification Search
CPC .... G06F 9/4401; G06F 9/5038; G06F 9/5005; G06F 9/44505

USPC .................................. 713/1, 2, 100; 718/104
See application file for complete search history.

(56) References Cited

U.S. PATENT DOCUMENTS

| | | |
|---|---|---|
| 7,461,244 B2 | 12/2008 | Chen |
| 7,793,288 B2 | 9/2010 | Sameske |
| 8,112,749 B2 | 2/2012 | Jelinek |
| 8,370,613 B1 | 2/2013 | Manadhata |
| 8,543,800 B2 | 9/2013 | Arditti |
| 8,769,159 B2 | 7/2014 | Tongen |
| 2006/0136913 A1 | 6/2006 | Sameske |

(Continued)

OTHER PUBLICATIONS

Buendgen et al., "Resource-Based Boot Sequence", U.S Appl. No. 15/887,089, filed Feb. 2, 2018, pp. 1-25.

(Continued)

*Primary Examiner* — Ji H Bae
(74) *Attorney, Agent, or Firm* — Aaron N. Pontikos

(57) ABSTRACT

A computer-implemented method, for booting a computer system, that provides a list with entries of startup processes. Each startup process defines a resource of the computer system. For each startup process a requirement is defined. The method further comprises fetching one of the entries of the list with entries of startup processes; determining whether the requirement is satisfied for the one of the entries of the list with entries of startup processes; fetching, in case the requirement is not fulfilled, a next one of the entries of the list with entries of startup processes; starting, in case the required resource is fulfilled, the startup process; and repeating the fetching a next one of the entries, the determining and the starting until all startup processes of the list of startup processes have been started.

1 Claim, 7 Drawing Sheets

(56) References Cited

U.S. PATENT DOCUMENTS

| | | |
|---|---|---|
| 2009/0119496 A1 | 5/2009 | Chen |
| 2012/0260080 A1 | 10/2012 | Myadam |
| 2012/0278600 A1 | 11/2012 | Mese et al. |
| 2015/0033005 A1 | 1/2015 | Surapuram |
| 2015/0309804 A1 | 10/2015 | Mese |
| 2015/0324244 A1 | 11/2015 | Murthy |
| 2019/0018688 A1 | 1/2019 | Buendgen |
| 2019/0018689 A1 | 1/2019 | Buendgen |

OTHER PUBLICATIONS

IBM Appendix P, "List of patents and patent applications treated as related", filed herewith, 2 pages.

RESOURCE-BASED BOOT SEQUENCE

BACKGROUND OF THE INVENTION

The invention relates generally to a computer-implemented method for booting a computer system, and more specifically, to a resource-based boot sequence. The invention relates further to a related boot module for booting a computer system, and a computer program product. Today's computing centers—in particular cloud computing centers and also hybrid approaches—rely heavily on virtual machines as a key delivery mechanism for providing ad-hoc IT (information technology) resources for pilot projects, testing purposes and also for production environments. In such a context, it is paramount to set up virtual machines in virtually no time, i.e., the time required for booting the virtual machine becomes a critical parameter.

Today, upon a boot request for a virtual machine, the virtual machine is constructed with all resources available, i.e., after all requested virtual CPUs, memory resources and devices are available for the new virtual machine. This may cause some delays in booting the virtual machine. Given the sheer size of today's systems—e.g., terabytes of memory, hundred or more CPUs, and so on—it becomes uneconomical to firstly construct the container for the virtual machine with all resources before booting the system because it may imply clearing a terabyte of requested memory. On the other hand, booting a system of virtual machines before all resources are available may cause unexpected failures during the startup of services. A simple example may be an out-of-memory situation due to the fact that at a certain point in time, during the boot process, sufficient memory is not available.

SUMMARY

According to one aspect of the present invention, a computer-implemented method for booting a computer system may be provided. The method may comprise providing a list comprising entries of startup processes. Each startup process may define a resource of the computer system. For each startup process a requirement may be defined. It may also be noted that the provided list may be named extended boot sequence table.

The method may further comprise fetching one of the entries of the list with entries of startup processes, determining whether the requirement is satisfied for the one of the entries of the list with entries of startup processes, fetching, in case the requirement is not fulfilled, a next one of the entries of the list with entries of startup processes, starting, in case the required resource is fulfilled, the startup process, and repeating the fetching a next one of the entries, the determining and the starting until all startup processes of the list of startup processes have been started.

According to another aspect of the present invention, a boot module for booting a computer system may be provided. The boot module may comprise an extended boot sequence table providing unit configured to provide a list with entries of startup processes. Each startup process may define a—required—resource of the computer system and for each startup process a requirement may be defined.

The boot module may additionally comprise a fetching unit configured to fetch one of the entries of the list with entries of startup processes, a determining unit configured to determine whether the requirement is satisfied for the one of the entries of the list with entries of startup processes. The fetching unit may also be configured to fetch, in case the requirement is not fulfilled, a next one of the entries of the list with entries of startup processes.

Furthermore, the boot module may comprise a start module configured to start, in case the required resource is fulfilled, the startup process. The fetching unit, the determining unit and the start unit may, in combination, be configured to repeat the fetching a next one of the entries, the determining and the starting until all startup processes of the list of startup processes have been started.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Figure 1:
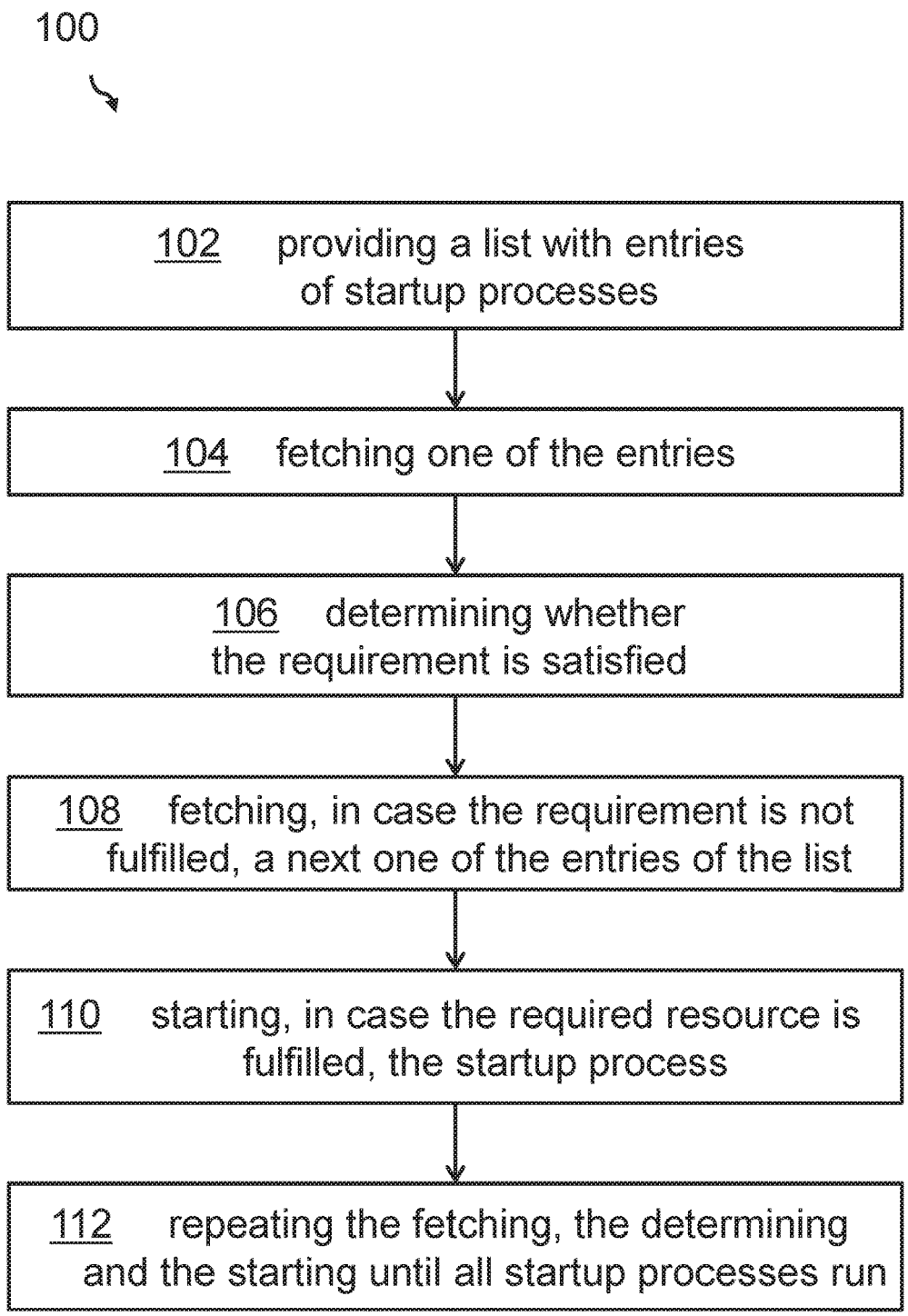
Figure 2:
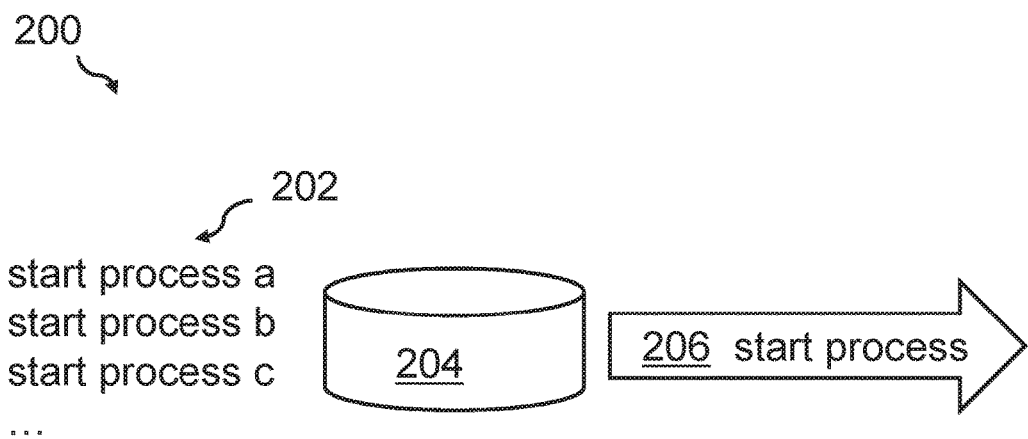
Figure 3:
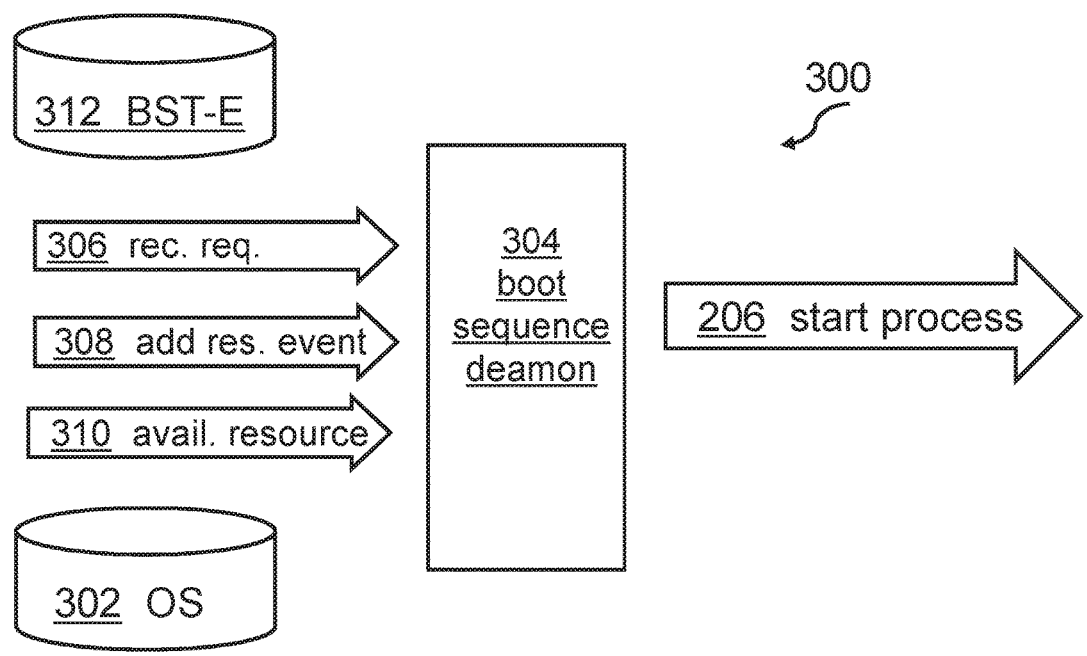
Figure 4:
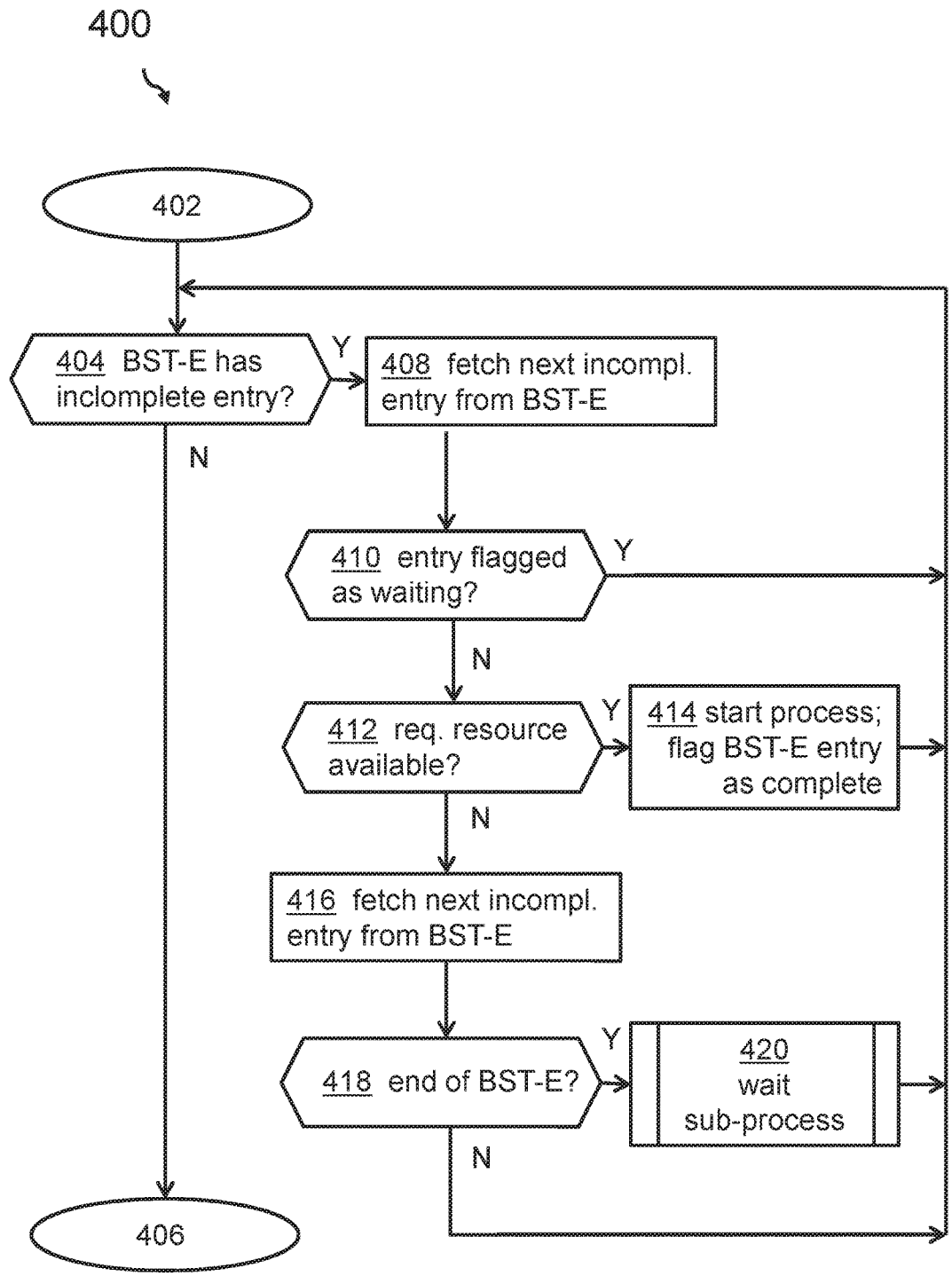
Figure 5:
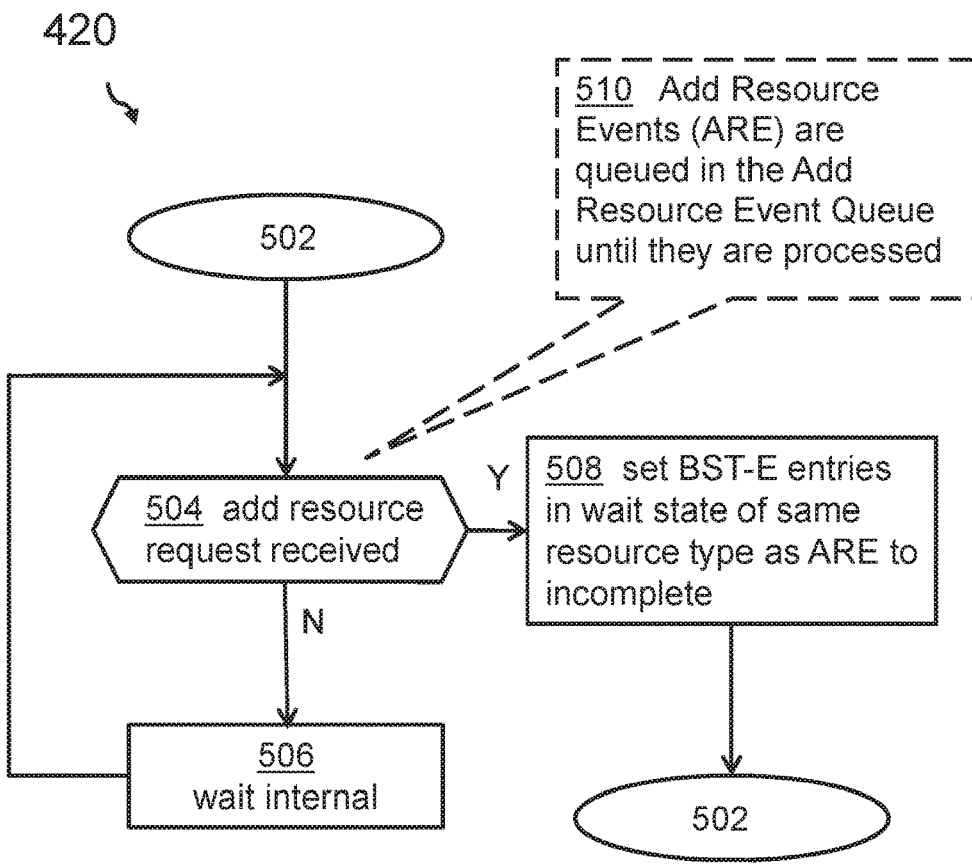
Figure 6:
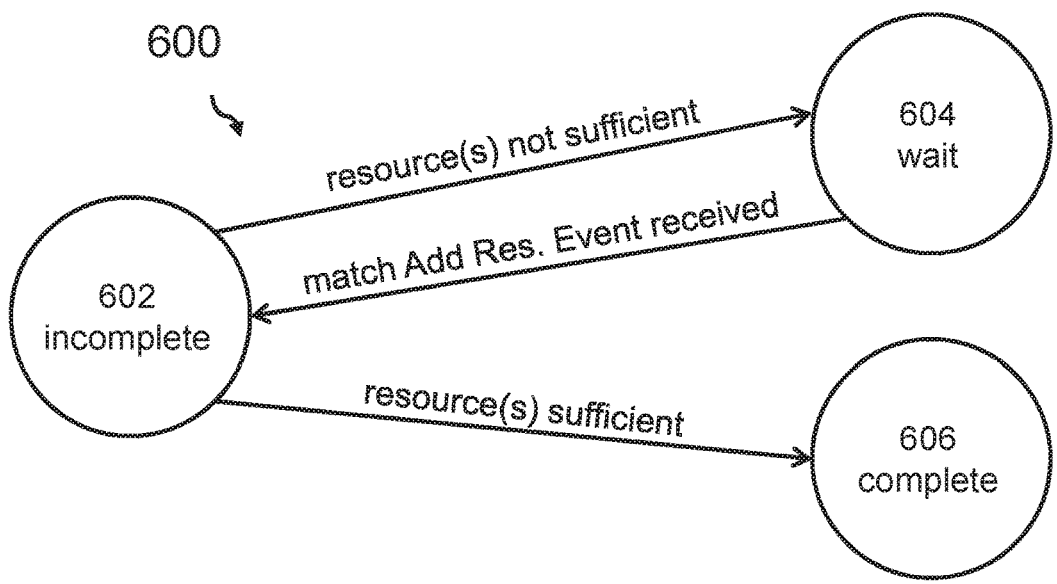
Figure 7:
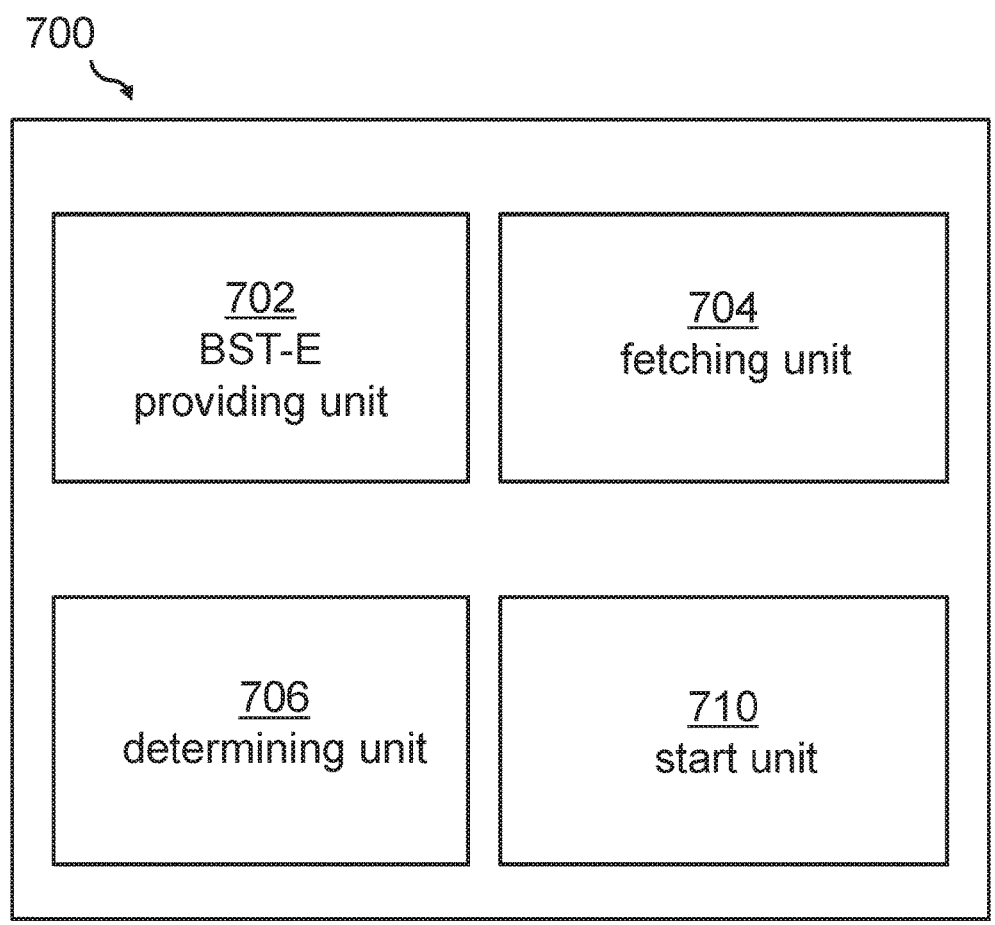
Figure 8:
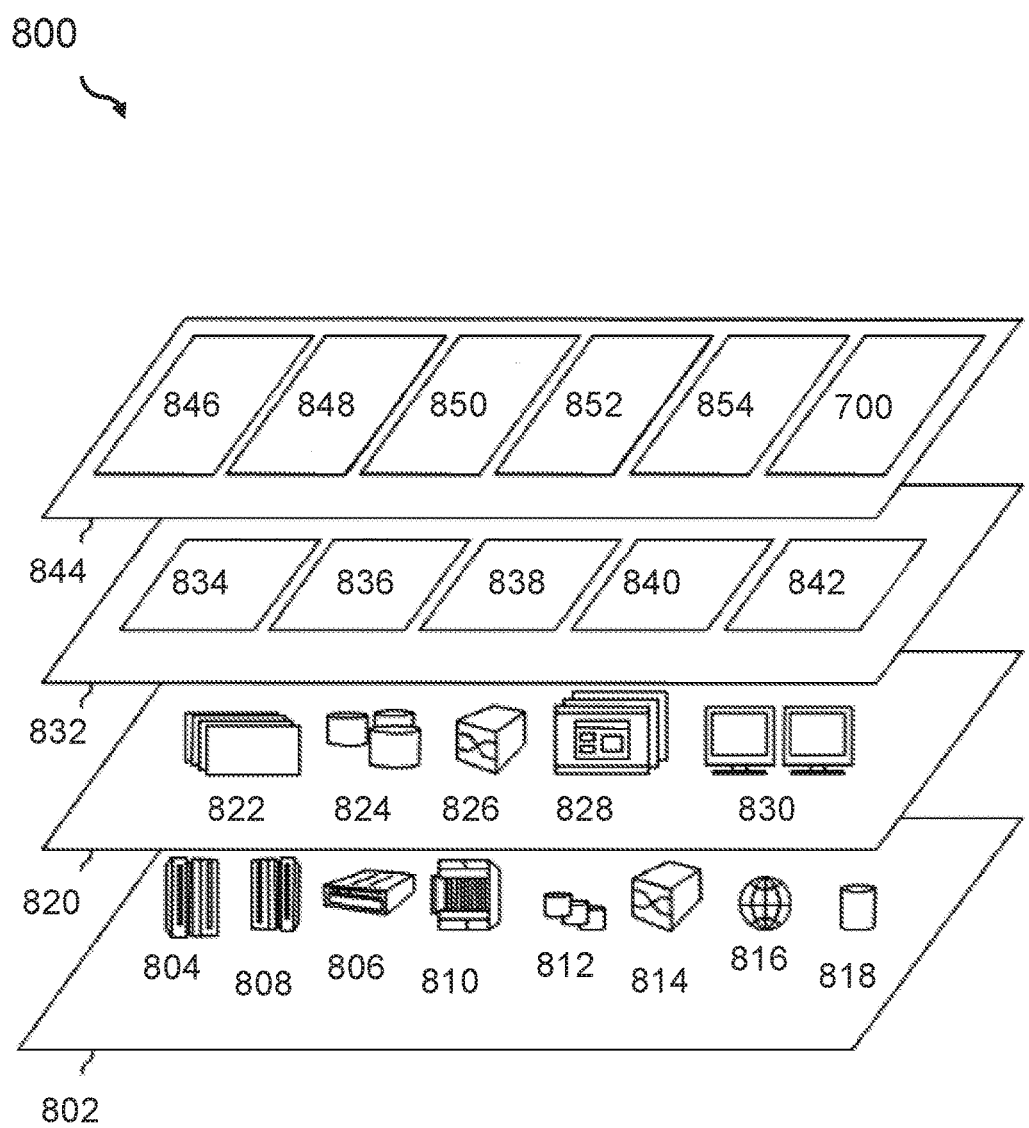
Figure 9:
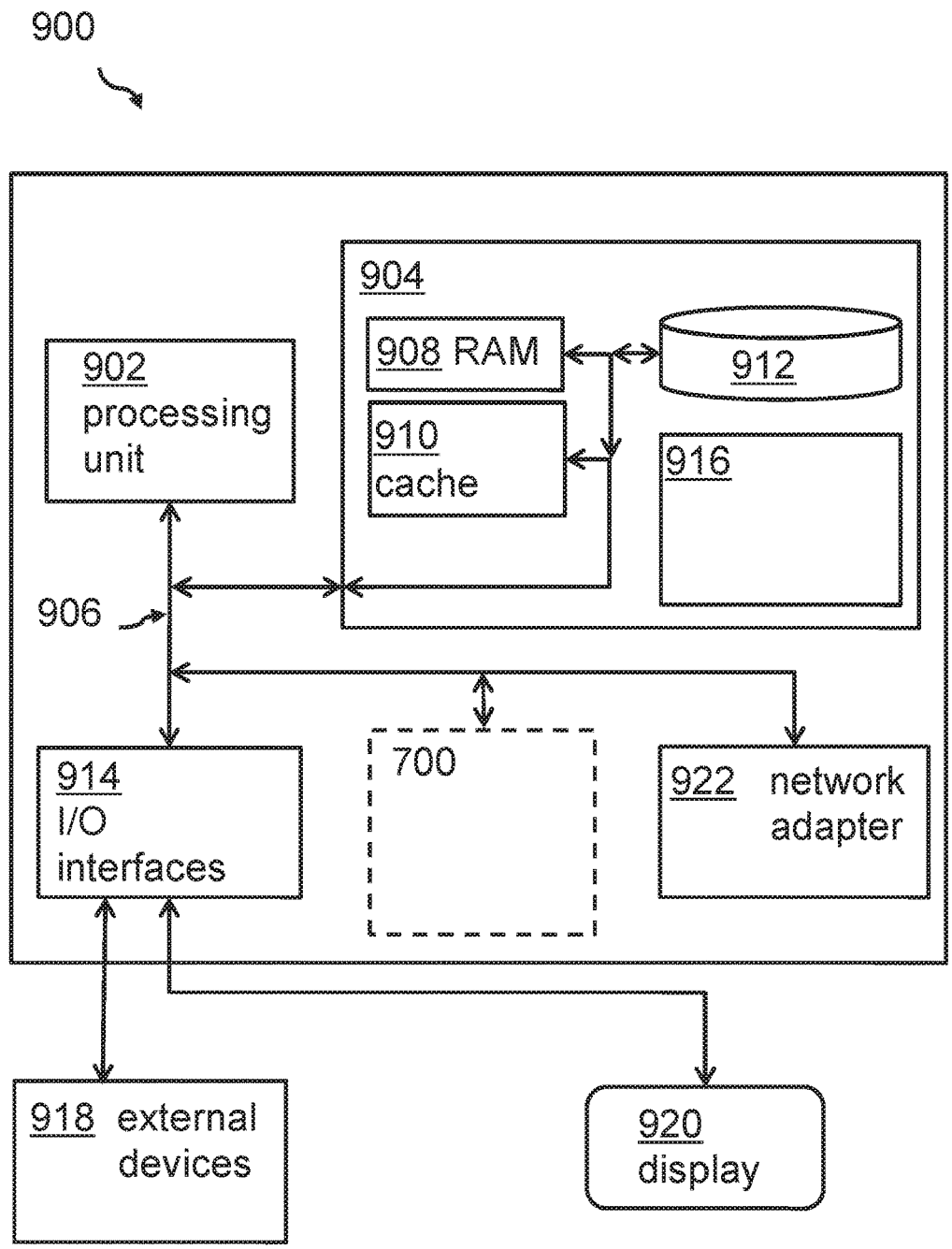

Preferred embodiments of the invention will be described, by way of example only, and with reference to the following drawings:

FIG. 1 shows a block diagram of a computer-implemented method for booting a computer system in accordance with at least one embodiment of the present invention;

FIG. 2 shows a block diagram of a known boot process;

FIG. 3 shows a block diagram of a boot process in accordance with at least one embodiment of the present invention;

FIG. 4 shows a more comprehensive block diagram of method in accordance with at least one embodiment of the present invention;

FIG. 5 shows the wait sub-process of FIG. 4, in accordance with at least one embodiment of the present invention;

FIG. 6 shows a state diagram for a state engine corresponding to a method, in accordance with at least one embodiment of the present invention;

FIG. 7 shows a boot module for booting a computer system in accordance with at least one embodiment of the present invention;

FIG. 8 shows a cloud computing environment in accordance with at least one embodiment of the present invention; and FIG. 9 shows a computing system comprising a boot module in accordance with at least one embodiment of the present invention.

DETAILED DESCRIPTION

In the context of this description, the following conventions, terms and/or expressions may be used:

The term 'booting' (or booting up) may denote an initialization of a computerized system. The system may be a computer or a computer appliance (a read or a virtual system). The booting process may be "hard", e.g., after electrical power to the CPU is switched from "off" to "on" (in order to diagnose particular hardware errors), or "soft", when those power-on self-tests (POST) can be avoided. On some systems, a soft boot may optionally clear the memory to zero. Both, hard and soft booting may be initiated by hardware such as a button press, or by a software command. Booting may be complete when the normal, operative, runtime environment is attained. A boot-loader may be instrumental for booting a system. Typically, a minimal set of resources may be required for specific portions of the boot process. For example, a software component as part of a boot process may not fit into the available main memory for execution. In such a case, the boot process cannot be continued with this component until the resource may become available. However, it may be continued with other required components requiring less resources.

The term 'startup processes' or process may denote an instance of a computer program—or a part thereof—that is being executed. It contains the program code and its current activity. In this sense, a startup process is a process required for a startup or booting of a computer. Depending on the operating system (OS), a process may be made up of multiple threads of execution that execute instructions concurrently.

The term 'resource' may denote a hardware or a software component required to perform a task, like executing program code of a process. Examples of resources are a CPU (central processing unit), memory in any form (main memory, hard drive storage, cache memory, shared memory in case of multiprocessor systems), an input/output adapter, a communication channel, a peripheral device, address space, a mathematic coprocessor, a crypto-processor, a CPU core, and the like. The required resource may represent a "must-have" for a process in order to run the process.

The term 'wait status' may denote the opposite status to a "run status" or "execute status". In the wait status a process may not proceed with its execution. The process may simply wait before a clearance is given to execute next program or process steps. Alternatively, the process may be hibernated, interrupted or stopped with the option to continue execution if the reason for the halt may be gone.

The term 'virtual machine' (VM) may denote an emulation of a computer system. Virtual machines may be based on computer architectures and may provide functionality of a physical computer. Their implementations may involve specialized hardware, software, or a combination. VMs may provide a substitute for a real machine. They provide functionality needed to execute entire operating systems. A hypervisor may use native execution to share and manage hardware, allowing for multiple environments which are isolated from one another, yet exist on the same physical machine. Modern hypervisors may use hardware-assisted virtualization, virtualization-specific hardware, primarily from the host CPUs.

The term 'daemon', may denote—in particular in multitasking computer operating systems a computer program that may run as a background process, rather than being under the direct control of an interactive user.

In this document, cloud computing services, cloud computing environments and virtual machines are mentioned several times. Such services may belong to cloud computing in general, which may be a model for enabling convenient, on-demand network access to a shared pool of configurable computing resources (e.g., networks, servers, storage, applications, and services) that may be rapidly provisioned and released with minimal management effort or service provider interaction. This cloud model may promote availability and may be composed of five essential characteristics, three service models and four deployment models.

Essential Characteristics of cloud computing comprise (i) On-demand self-service: A consumer can unilaterally provision computing capabilities, such as server time and network storage, as needed automatically without requiring human interaction with each service provider.

(ii) Broad network access: Capabilities are available over the network and accessed through standard mechanisms that promote use by heterogeneous thin or thick client platforms (e.g., mobile phones, laptop computers, tablet computers, and PDAs).

(iii) Resource pooling: The provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.

(iv) Rapid elasticity: Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

(v) Measured Service: cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both, the provider and consumer of the utilized service.

Service models for cloud computing used comprise:

(i) Cloud Software as a Service (SaaS): The capability provided to the consumer is to use the provider's applications running on a cloud infrastructure. The applications are accessible from various client devices through a thin client interface such as a Web browser (e.g., Web-based e-mail). The consumer does not manage or control the underlying cloud infrastructure including network, servers, operating systems, storage, or even individual application capabilities, with the possible exception of limited user-specific application configuration settings.

(ii) Cloud Platform as a Service (PaaS): The capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly applications hosting environment configurations.

(iii) Cloud Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of selected networking components (e.g., host firewalls).

Deployment models for cloud computing comprise (i) Private cloud. The cloud infrastructure is operated solely by an organization. It may be managed by the organization or a third party and may exist on premise or off premise.

(ii) Community cloud. The cloud infrastructure is shared by several organizations and supports a specific community that has shared concerns (e.g., mission, security requirements, policy, and compliance considerations). It may be managed by the organizations or a third party and may exist on premise or off premise.

(iii) Public cloud. The cloud infrastructure is made available to the general public or a large industry group and is owned by an organization selling cloud services, e.g., a cloud service provider.

(iv) Hybrid cloud. The cloud infrastructure is a composition of two or more clouds (private, community, or public) that remain unique entities but are bound together by standardized or proprietary technology that enables data and application portability (e.g., cloud bursting for load-balancing between clouds).

It may be noted that cloud software may take full advantage of the cloud paradigm by being service-oriented with a focus on statelessness, low coupling, modularity, and semantic interoperability.

The disclosed computer-implemented method for booting a computer system may offer multiple advantages and technical effects:

Waiting until all requested resources for a new virtual (or real) machine to be booted may be avoided. This may decrease the time required to boot a new virtual machine. By making startup processes depending on individual requirements, i.e., required resources for this particular startup process, not all prerequisites must be met before the complete startup procedure or boot sequence table may be executed. Hence, individual startup processes, which requirements or prerequisite(s) may already be met may, be started even before requirements for all startup processes may be fulfilled.

As a consequence, those startup processes of the extended boot sequence table which requirements are fulfilled may be started immediately, whereas other startup processes which prerequisites are not fulfilled yet may be put in a wait status, i.e., delayed. At the time a prerequisite for another startup process may be fulfilled, the related wait status may be released and the additional startup process may be initiated. At the same time, the other startup processes—which requirements have been fulfilled before—are already up and running.

That way, the startup processes are initiated and executed in a flexible sequence the requirements are fulfilled and not in a static predefined way. If a startup process may not be started due to a not fulfilled requirement, other startup processes which requirements may already be fulfilled may be started. The time for the startup processes may be denoted as the waiting time for the startup process which requirements have not been fulfilled at the start of an extended boot sequence table. Thus, the risk of a blocking of an extended boot sequence table may be reduced significantly because a startup process may be started as soon as the related requirement is fulfilled. The execution of the boot sequence table may not be delayed completely until all requirements for all startup processes may be fulfilled at one point in time. Hence, the startup process may be executed in a shorter time if compared to traditionally managed startup processes. In particularly in large complex cloud computing environments with thousands of virtual machines, such a time advantage may prove to be significantly.

In the following further embodiments of the method and the related system will be described:

According to one preferred embodiment, the method may also comprise setting an entry of the list with entries of startup processes in a wait status if the requirement is not fulfilled. Thus, the process cannot be executed as part of the boot sequence if the requirement is not fulfilled. Only those processes may be started as part of the boot sequence which requirements are fulfilled. No attempt is made to start a process if the requirement is not fulfilled resulting in unnecessary errors messages and/or warnings.

According to an advantageous embodiment, the method may comprise removing the wait status for the entry if a trigger is received, indicative of a required resource becoming available and satisfying the requirement. Thus, the related process may be started as part of the boot sequence if the requirement is fulfilled. A straight forward boot sequence may be guaranteed without any waste of resource, i.e., to early process start attempts or a completely blocked boot sequence because not all requirements ought to be fulfilled at one point in time.

According to an optional embodiment of the method, the requirement may be defined by an explicit configuration setting, e.g., by defining that one of the requirements may be a minimum of a specific amount of memory, e.g., 1 GB of main memory. Hence, the related process cannot be started if not 1 GB of contiguous main memory (e.g., in a real or a virtual address space) is available.

According to one permissive embodiment of the method, the requirement may be defined by a measurement or a calculation performed. Thus, as an example, depending on the related process and/or start parameter values for the process, a minimal input/output throughput rate may be required which may, as a consequence, require a minimal number of adapters, each with a predefined throughput rate.

According to a further advantageous embodiment of the method, the requirement may be a minimal exclusively available resource. This may, e.g., be the case for memory resources which may not be shared among processes.

According to another advantageous embodiment of the method, the requirement may be shared among processes. This may be the case with input/output adapters which may normally be shared among processes using the resource. For input/output adapters, a kind of over-commitment may also be allowable.

According to one additionally preferred embodiment of the method, the requirement may be defined by a policy, defining a sequence of depending processes, priorities. Thus, weighing factor values may be defined, organizing a sequence of boot processes if the processes in question may be started in parallel but requiring the same exclusive resource. Thus, competition between the processes for the same resource may be avoided which may potentially end in a deadlock situation.

According to a further advantageous embodiment of the method, the computer system may be a physical computer system or a virtual machine. Hence, there are no limits regarding the type of computer supported by the concept newly disclosed herein.

According to one useful embodiment of the method, the resource may be is characterized or defined by its type and quantity, i.e., an amount of memory in GB, a number of input/output adapters or a number of network connections. The type and quantity may be defined for a real or a virtual computer system/machine.

In the following, a detailed description of the figures will be given. All instructions in the figures are schematic. Firstly, a block diagram of an embodiment of the inventive computer-implemented method for booting a computer system is given. Afterwards, further embodiments, as well as embodiments of the boot module for booting a computer system, will be described.

FIG. 1 shows a block diagram of an embodiment of the computer-implemented method 100 for booting a computer system—either a real or a virtual machine. The method comprises providing, 102, a list with entries of startup processes. This list may be denoted as extended boot sequence table (BST-E). Each startup process defines a resource—like memory, storage, IOs, CPU(s)—of the computer system. For each startup process a requirement—which may be one or more requirements—is defined.

The method also comprises fetching, 104, one of the entries of the list with entries of startup processes, determining, 106, whether the requirement is satisfied for the one of the entries of the list with entries of startup processes and fetching, 108, in case the requirement is not fulfilled, a next one of the entries of the list with entries of startup processes. Furthermore, the method comprises starting, 110, in case the required resource is fulfilled, the startup process, and repeating, 112, the fetching a next one of the entries, the determining and the starting until all startup processes of the list of startup processes have been started.

Optionally, more than one resource or startup related requirement may be defined. Thus, a process may only be started if all conditions are fulfilled.

FIG. 2 shows a block diagram of an embodiment of a known boot process 200. A state of the art approach of a boot sequence table comprises a static list 202 of processes to be started in the listed order. As an example, the daemon "system" represents the state-of-the-art in Linux systems to control the system startup 206 based on so-called services. The boot sequence table may be stored, e.g., on a hard drive 204. Thus, no flexibility exists in traditional startup systems.

The services might depend on another service, having been started or already in the process of being started (most usual dependency), that a particular device has become available (e.g., serial console, USB inserted) or that another service has been terminated (e.g., clean-up service during shutdown).

When such a dependency is matched then ALL dependent services are started. It is not possible to define how many services need to become available, such as "at least 3 USB devices". It is also not possible to define "consumption" of a service such as "the service consumes one serial interface—this serial interface is reserved and not available for other services". Furthermore, it is not possible to define priorities—when two or more services to dependencies are met, which one should be started first.

Although high availability policies may provide policies to start resources that are based on resource availabilities, resource dependencies or start orders, they do neither wait for hot clock events nor do they consider resource quantities (e.g., specific amount of available memory).

FIG. 3 shows a block diagram 300 of an embodiment of a boot process according to the concept disclosed herein and in the context of the known boot process of FIG. 2. The basic idea of the concept disclosed herein is to extend the boot sequence table with requirements for services (process), e.g., of the operating system 302. Additionally, an additional boot sequence daemon 304 (which may also be integrated into the existing system) may be required which is enabled to handle "Resource Requests" 306 and "Add Resource Events" 308 for executing the complete start process 206.

"Add Resource Events" are triggered if a specific resource becomes available (available resource 310). They are bound to a resource type so that only processes depending on this resource type have to be investigated by the boot sequence daemon.

As additional input to the start process, the boot sequence table (compare FIG. 2) may be extended to an extended boot sequence table (BST-E) 312. The BST-E is extended by resource requirements for each process that is listed. The requirements may be of different types as shown below.

Instead of the boot sequence table 202 of FIG. 2, the BST-E may now look like:

TABLE 1

| |
| --- |
| start process a, has requirement x |
| start process b, has requirement y |
| start process c, has requirement z |

The requirements can either be set explicitly via a configurator or may be determined by a measurement or calculation.

The requirements can be minimal exclusive—e.g., for an amount of memory—or shared—e.g., IO devices—to be able to run. Over-commitments may be allowed for shared devices.

Furthermore, the requirements can be based on a policy, e.g., in the form of a pre-defined sequence (process b depends on process a), priorities or weights. Hence, the one requirement shown in table 1 above may be a combination of sub-requirements, each of which may again be cross-dependent to other requirements. Thus, a tree of requirements may be defined.

The above-mentioned boot sequence daemon 304 is running in a loop over the startup process until all the required start processes that are listed in the extended boot sequence table 312 are started.

FIG. 4 shows a more comprehensive block diagram 400 of an embodiment of the disclosed method 100 which starts at 402. In a first step, it is determined whether the BST-E has an incomplete entry, 404. Then, the boot sequence daemon fetches, 408, the next incomplete entry from the BST-E.

If a waiting flag is set for a required resource and if the required resources are available (compare 410, 412), the process is started and the corresponding state entry in the BST-E is set to "complete", 414." Then the loop starts from the beginning.

If the required resource is not available, the corresponding state entry for the process in the BST-E is set to "waiting". If the resource is not available, the boot sequence daemon fetches, 416, a next incomplete entry from the BST-E. If there are more entries in the BST-E, 418, the wait sub-process 420 is started.

If the BST-E has no additional incomplete entries—case no of determination 404—this process ends, 406.

FIG. 5 shows an embodiment of the wait sub-process 420 of FIG. 4. The wait sub-process 420 starts at 502. Firstly, it is determined, 504, whether an add resource request (ARE) has been received. In case of yes, the boot sequence daemon sets, 508, all entries of the BST-E that are related to this type of resource and that are in state "waiting" to state "incomplete".

Otherwise, the wait cycle 506 is started and the next loop cycle continues after the wait cycle is complete.

It may be noted that a comment box 510 is pointing to the determination 504. This may be an indication for the fact that the Add Resource Events (ARE) are queued in the Add Resource Event queue until they are processed.—The wait sub-process 420 ends at 502.

FIG. 6 shows a simplified state transition diagram 600 for a state engine corresponding to the disclosed method 100. Each entry starts and stays "incomplete" 602. In the beginning and on each Add Resource Event, the entries with state "incomplete" are checked. If the required resources to start the process of this entry are not sufficient, it is set to "waiting", 604. If the resources are sufficient, the entry is set to "complete", 606.

On an Add Resource Event (ARE) all entries that have matching resource requirements are set to state "incomplete", 602.

FIG. 7 shows an embodiment of a boot module 700 for booting a computer system. The boot module 700 comprises an extended boot sequence table providing unit 702 configured to provide a list with entries of startup processes. The startup process defines a resource of the computer system. For each startup process a requirement is defined, as explained in the context of FIG. 3.

The boot module 700 comprises also a fetching unit 704 configured to fetch one of the entries of the list with entries of startup processes and a determining unit 706 configured to determine whether the requirement is satisfied for the one of the entries of the list with entries of startup processes.

The fetching unit 704 is also configured to fetch, in case the requirement is not fulfilled, a next one of the entries of the list with entries of startup processes and a start module 706 is configured to start the startup process, in case the required resource is fulfilled.

In the boot module 700 the fetching unit 704, the determining unit 706 and the start unit 708 are in combination configured to repeat the fetching a next one of the entries, the determining and the starting until all startup processes of the list of startup processes have been started.

FIG. 8 shows a cloud computing environment 800 in which at least parts of the inventive concept may be deployed. A set of functional abstraction layers provided by a cloud computing environment is shown. It should be understood in advance that the components, layers, and functions shown in FIG. 8 are intended to be only illustrative and embodiments of the invention are not limited thereto. As depicted, the following layers and corresponding functions are provided: hardware and software layers 802 include hardware and software components. Examples of hardware components include: mainframes 804; servers 806; RISC (Reduced Instruction Set Computer) architecture-based servers 808; blade servers 810; storage devices 812; networks 814 and networking components 814. In some embodiments, software components include network application server software 816 and/or database software 818.

A virtualization layer 820 provides an abstraction layer from which the following examples of virtual entities may be provided: virtual servers 822; virtual storage 824; virtual networks 826, including virtual private networks; virtual applications and operating systems 828; and virtual clients 830. In one example, management layer 832 may provide the functions described below. Resource provisioning 834 provides dynamic procurement of computing resources and other resources that are utilized to perform tasks within the cloud computing environment. Metering and pricing 836 provide cost tracking as resources are utilized within the cloud computing environment, and billing or invoicing for consumption of these resources. In one example, these resources may comprise application software licenses. Security provides identity verification for cloud consumers and tasks as well as protection for data and other resources. User portal 838 provides access to the cloud computing environment for consumers and system administrators. Service level management 840 provides cloud computing resource allocation and management such that required service levels are met. Service Level Agreement (SLA) planning and fulfillment 842 provides pre-arrangement for, and procurement of, cloud computing resources for which a future requirement is anticipated in accordance with an SLA.

Workload layer 844 provides examples of functionality for which the cloud computing environment may be utilized. Examples of workloads and functions which may be provided from this layer include: mapping and navigation 846; software development and lifecycle management 848; virtual classroom education delivery 850; data analytics processing 852; transaction processing 854; and boot module 700 for booting a computer system.

Embodiments of the invention may be implemented together with virtually any type of computer, regardless of the platform being suitable for storing and/or executing program code (real or virtual). FIG. 9 shows, as an example, a computing system 900 suitable for executing program code related to the disclosed method.

The computing system 900 is only one example of a suitable computer system and is not intended to suggest any limitation as to the scope of use or functionality of embodiments of the invention described herein. Regardless, computer system 900 is capable of being implemented and/or performing any of the functionality set forth hereinabove. In the computer system 900, there are components, which are operational with numerous other general purpose or special purpose computing system environments or configurations. Examples of well-known computing systems, environments, and/or configurations that may be suitable for use with computer system/server 900 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 900 may be described in the general context of computer system-executable instructions, such as program modules, being executed by a computer system 900. Generally, program modules may include routines, programs, objects, components, logic, data structures, and so on that perform particular tasks or implement particular abstract data types. Computer system/server 900 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 900 is shown in the form of a general-purpose computing device. The components of computer system/server 900 may include, but are not limited to, one or more processors or processing units 902, a system memory 904, and a bus 906 that couples various system components including system memory 904 to the processor 902. Bus 906 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 900 typically includes a variety of computer system readable media. Such media may be any available media that is accessible by computer system/server 900, and it includes both, volatile and non-volatile media, removable and non-removable media.

The system memory 904 may include computer system readable media in the form of volatile memory, such as random access memory (RAM) 908 and/or cache memory 910. Computer system/server 900 may further include other removable/non-removable, volatile/non-volatile computer system storage media. By way of example only, storage system 912 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 906 by one or more data media interfaces. As will be further depicted and described below, memory 904 may include at least one program product having a set (e.g., at least one) of program modules that are configured to carry out the functions of embodiments of the invention.

The program/utility, having a set (at least one) of program modules 916, may be stored in memory 904 by way of example, and not limitation, as well as an operating system, one or more application programs, other program modules, and program data. Each of the operating system, one or more application programs, other program modules, and program data or some combination thereof, may include an implementation of a networking environment. Program modules 916 generally carry out the functions and/or methodologies of embodiments of the invention as described herein.

The computer system/server 900 may also communicate with one or more external devices 918 such as a keyboard, a pointing device, a display 920, etc.; one or more devices that enable a user to interact with computer system/server 900; and/or any devices (e.g., network card, modem, etc.) that enable computer system/server 900 to communicate with one or more other computing devices. Such communication can occur via Input/Output (I/O) interfaces 914. Still yet, computer system/server 900 may communicate with one or more networks such as a local area network (LAN), a general wide area network (WAN), and/or a public network (e.g., the Internet) via network adapter 922. As depicted, network adapter 922 may communicate with the other components of computer system/server 900 via bus 906. It should be understood that although not shown, other hardware and/or software components could be used in conjunction with computer system/server 900. Examples, include, but are not limited to: microcode, device drivers, redundant processing units, external disk drive arrays, RAID systems, tape drives, and data archival storage systems, etc.

Additionally, a boot module 700 for booting a computer system may be attached to the bus system 906.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The invention claimed is:

1. A computer-implemented method for booting a computer system, comprising:
    producing an extended boot sequence table (BST-E) with respect to a plurality of startup processes, wherein:
        for each startup process, the BST-E includes a computer system resource requirement;
        the computer system resource requirement is defined by a policy defining a sequence of depending processes; and
        the computer system resource requirement is characterized by a type and a quantity;
    determining, with respect to each startup process, whether a corresponding computer system resource requirement is satisfied based, at least in part, on an explicit configuration setting and a measurement and/or calculation;

for each startup process of the plurality of startup processes, on condition a corresponding system resource requirement is satisfied, starting the startup process;

for each startup process:
- on condition the corresponding system resource requirement is not satisfied, placing the startup process in a wait status;
- receiving a trigger indicative of a first resource becoming available, the first resource satisfying a first computer system resource requirement for a first corresponding startup process that is in a first wait status;
- removing the first wait status from the first corresponding startup process; and
- starting the first corresponding startup process.

* * * * *